340-870.15 SR

XR 2,713,533

July 19, 1955 J. T. FORRELLAD 2,713,533

DEVICE FOR RECORDING TIME INTERVALS IN APPARATUS SUPERVISING AND RECORDING THE OPERATION OF MACHINES WHICH PERFORM DIVERSE OPERATIONAL STEPS

Filed Jan. 9, 1951 4 Sheets-Sheet 1

INVENTOR.

Jose Tous Forrellad

BY

Haseltine, Lake & Co.

AGENTS

DEVICE FOR RECORDING TIME INTERVALS IN APPARATUS SUPERVISING AND RECORDING THE OPERATION OF MACHINES WHICH PERFORM DIVERSE OPERATIONAL STEPS

Filed Jan. 9, 1951 4 Sheets-Sheet 2

INVENTOR.

Jose Tous Forrellad

BY

Haseltine, Lake & Co.

AGENTS

DEVICE FOR RECORDING TIME INTERVALS IN APPARATUS SUPERVISING AND RECORDING THE OPERATION OF MACHINES WHICH PERFORM DIVERSE OPERATIONAL STEPS

Filed Jan. 9, 1951 4 Sheets-Sheet 3

INVENTOR.
Jose Tous Forrellad
BY
Haseltine, Lake & Co.
AGENTS

DEVICE FOR RECORDING TIME INTERVALS IN APPARATUS SUPERVISING AND RECORDING THE OPERATION OF MACHINES WHICH PERFORM DIVERSE OPERATIONAL STEPS

Filed Jan. 9, 1951 4 Sheets-Sheet 4

INVENTOR.
Jose Tous Forrellad
BY
Haseltine, Lake & Co.
AGENTS

United States Patent Office 2,713,533

Patented July 19, 1955

2,713,533

DEVICE FOR RECORDING TIME INTERVALS IN APPARATUS SUPERVISING AND RECORDING THE OPERATION OF MACHINES WHICH PERFORM DIVERSE OPERATIONAL STEPS

Jose Tous Forrellad, Barcelona, Spain

Application January 9, 1951, Serial No. 205,090

Claims priority, application Spain December 11, 1950

13 Claims. (Cl. 346—81)

The present invention relates to improvements in apparatus for supervising and recording the operation of machines which perform diverse operational steps. More specifically, this invention relates to improvements in mechanism for recording time intervals in apparatus for supervising and recording the operation of machines of the kind referred to above.

In supervising and recording apparatus of the described character a printed record is made on a moving sheet to provide an indication of the operations performed by an associated machine. In the supervising and recording apparatus existing prior to this invention, it has been the general practice to employ a moving sheet having either spaced lines or numerals previously printed thereon to indicate the time at which the various recorded operations of the associated machine are performed, and such an arrangement can accurately indicate the times of the recorded operations only if the movement of the record sheet is accurately synchronized with the passage of time and is continuous. However, since the machine associated with the supervising and recording apparatus may be inoperative for periods of varying duration, the continuous movement of the record sheet, to maintain the latter's synchronization with the passage of time, will result in considerable waste of the record sheet.

Accordingly, it is an object of the present invention to provide supervising and recording apparatus of the described character having mechanism controlled by a master clock for applying or recording time indications on a record sheet during the movement of the latter, and wherein the applied time indications always reflect the actual time established by the master clock even when the movement of the record sheet and the operation of the associated machine are intermittent or discontinuous.

Another object is to provide an apparatus of the described character, wherein the mechanisms for controlling synchronization of the recorded time indications with the time established by the master clock require a minimum actuating force so that an ordinary clockwork can be used for driving such mechanisms without the necessity of employing any means for boosting or amplifying the force exerted by the clockwork.

In accordance with the present invention, the master clock rotates one or more light-weight drums having projections thereon for tripping well balanced mercury switches which replace the usually employed commutators and are actuated without any great effort. Further, the time recording elements are driven by mechanical means apart from the master clock and the coupling of the time recording elements to the mechanical driving means is achieved by electromagnetic means, with the energization of the latter being regulated by the balanced mercury switches. Thus, the time recording elements can be driven by a force as great as is necessary without overburdening the master clock and thereby disturbing the accuracy of the latter.

A further object of the same invention is the provision of means for the change of the direction of movement of the ink impregnated tape destined for the impression of the mentioned time references and working graphs, in order to avoid wrong operations in the automatic working of said appliances which, as they are derived from the mechanical transmissions of the apparatus, may determine the mistaken engagement of the gearings of the ink impregnated tape control mechanisms, causing said tape to be arrested in its movement, or even causing the rupture of the same by continuing to exert traction thereon after the tape has been arrived at one of the extreme limits of the run thereof. This effect is attained by the fact of performing the movement direction reversal operation by electromagnetical means, displacing axially a driving axle, in combination with a safety device which prevents any axial movement of the former with the exception of the moments suitable to perform the reversal, the initiation of the said operation being effected by end of run stops, similar to those with which the usual typewriter ribbons are normally provided, in combination with two tipping devices bearing mercury switches.

Besides the above features, the improvements which will be described comprise a special arrangement of electrical connections, especially suitable to allow the reduction of the control connections to two for each machine, from the point of labour where the same are located up to the distant spot which the apparatus occupies, the generation of the electrical impulses of primary code or marks, characteristic of each of the labour operations or stages that the machines perform, being effected in common for all machines of one and the same machine room which the said electrical impulses generating device will be located in being connected to all machines the supervisory control of which it embraces, by means of a local line comprising as many conductors as primary codes or marks of impulses may be necessary for the supervisory control of the different working stages thereof.

Other objects, features and advantages of the invention will be apparent in the following description of illustrative embodiments thereof, all of them serving to improve the reliability and accuracy of the apparatus and the case with which the graphs or charts, representing the performance of an associated machine or machines, can be interpreted.

In order that the invention may be fully understood, the described illustrative embodiments, which are merely given by way of example, are shown in the accompanying drawings, forming a part hereof, and wherein.

Figures 7, 8, 9:
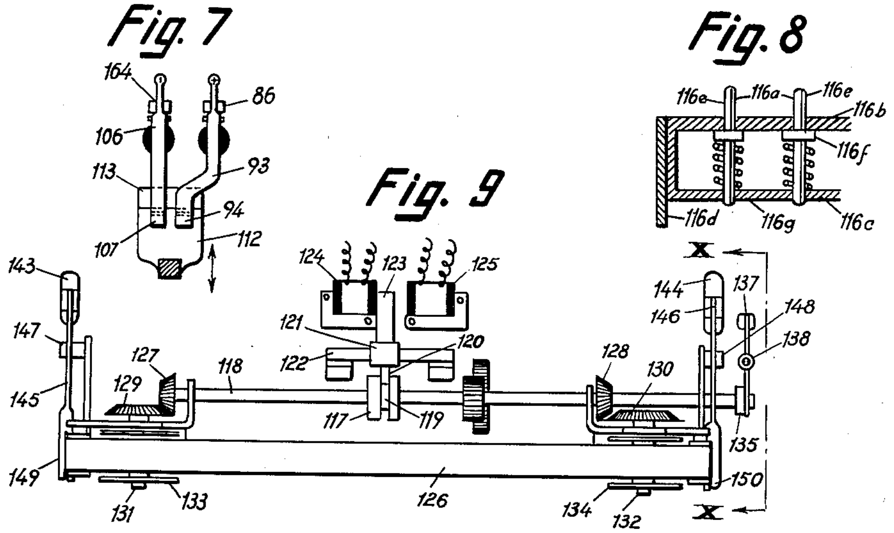
Fig. 7 is a vertical sectional view taken along the line VII—VII of Fig. 6.
Fig. 8 is a fragmentary sectional view showing the structural details of the minute recording element.
Figure 10:
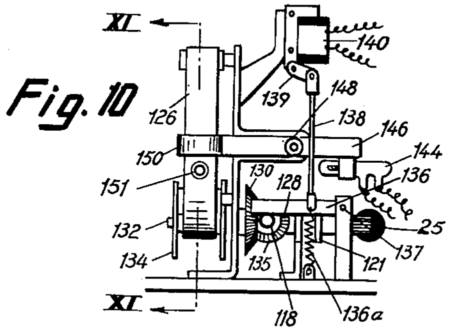
Figure 11:
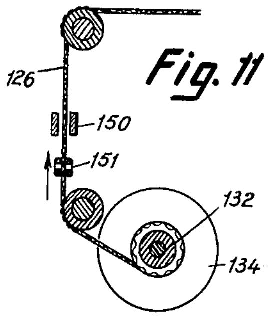
Figure 12:
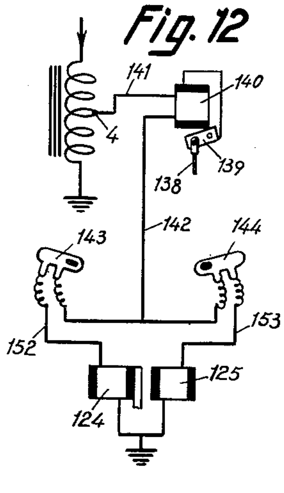
Figure 13:
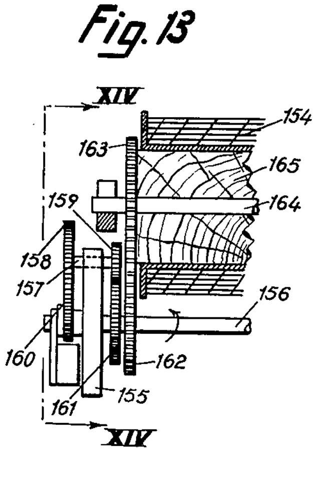
Figure 14:
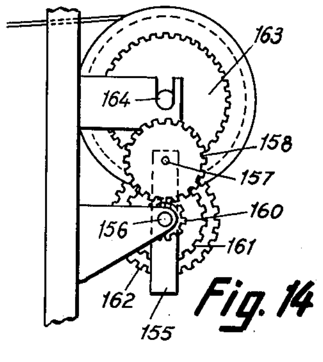

Fig. 9 indicates, in plan view, the arrangement of the driving and direction of movement reversing means of the ink impregnated tape;

Fig. 10 is the side view, viewed in the direction of the arrows X of Fig. 9, of the said driving and direction of movement reversing means of the ink impregnated tape;

Fig. 11 represents, in enlarged section, taken on the line XI—XI of Fig. 10, the arrangement of the actuating means for the devices represented in Figs. 9 and 10;

Fig. 12 is the wiring diagram of the connections for the control of the devices represented on the Figs. 9, 10 and 12;

Fig. 13 indicates, in partial elevation view, the arrangement of the braking and recovery means of the takeup roller of the paper strip or tape with the graphs traced thereof;

Fig. 14 indicates, likewise, an elevation view of the devices of Fig. 13, viewed in the direction of the arrows XIV.

Figure 15:
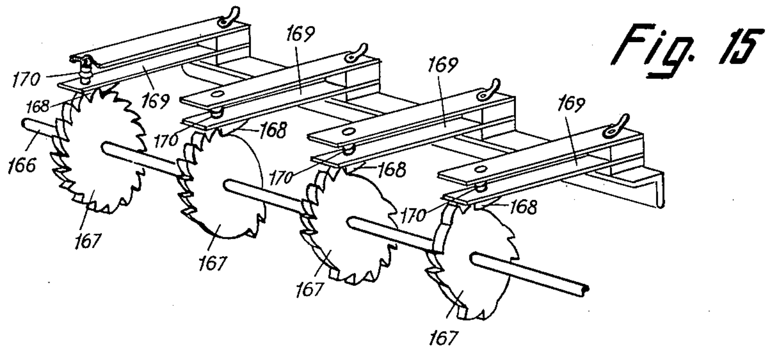
Figure 16:
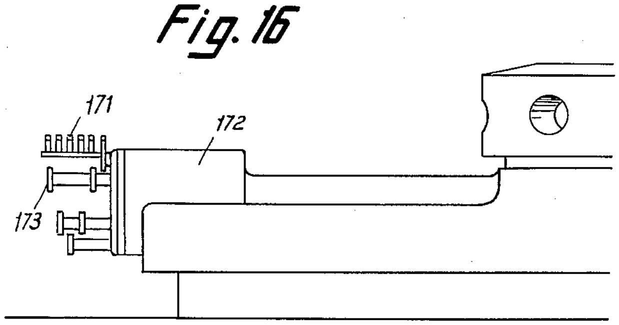
Figure 17:
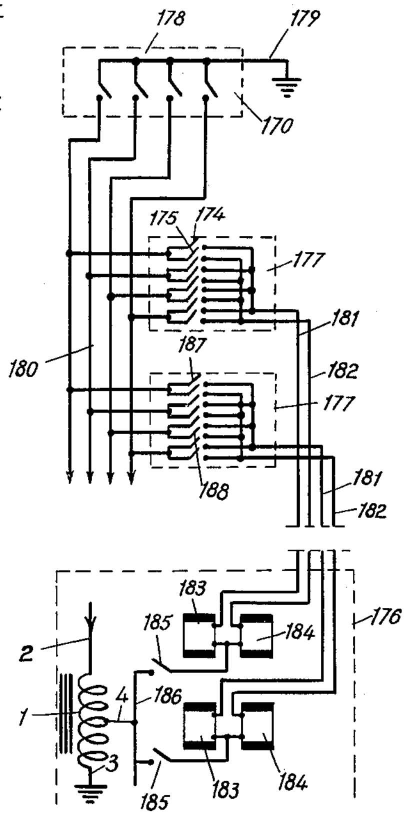
Figure 18:
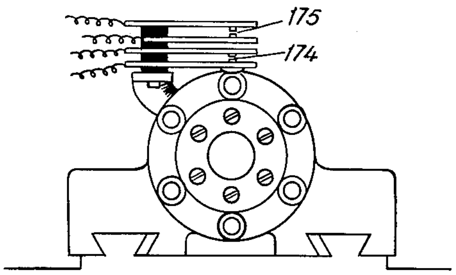

Fig. 15 is a perspective view of an impulses generating device for the recording of the different working stages of the machines in the case of four primary codes;

Fig. 16 is a side view of the detector devices of the different working stages, applied to the rotatory turret of a turret lathe;

Fig. 17 is the view according to plane XVII of the devices represented in Fig. 16 and Fig. 18 is a general scheme of an arrangement comprising a plurality of machines connected to a common impulses generating device, and to the corresponding control means of the labour graphs recording hammers.

Figure 1:
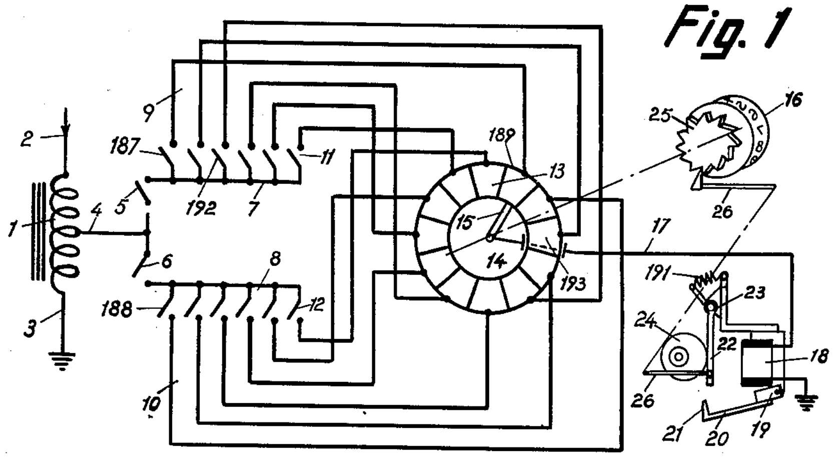
Fig. 1 is a diagrammatic representation of the electrical circuits for synchronizing the hour recording element with a master clock in apparatus embodying this invention.

Referring to the drawings in detail, and initially to Figs. 1 to 8 thereof, an arrangement embodying the present invention is there shown and operates to record the time established by a master clock on a moving record sheet. In the illustrated embodiment, a numeric designation of the actual time, in hours and minutes, is applied to a moving record sheet at the end of each five minute interval during the operation of the machine, while spaced dots or lines are applied to the moving record sheet at one minute intervals between the numeric designations. In order to apply such markings or designations to the moving record sheet, the illustrated time recording device includes a marking wheel 16 (Fig. 1) having twelve equally spaced apart marking elements or pieces of type on the periphery thereof for designating the hours 1, 2, 3, 4, 5, 6, 7, 8, 9, 10, 11, and 12; a marking wheel 33 (Fig. 2) having twelve equally spaced apart marking elements or pieces of type on the periphery thereof for designating the five minute intervals 00, 05, 10, 15, 20, 25, 30, 35, 40, 45, 50, and 55; and a stylus arrangement (Fig. 8) for applying the one-minute designations to the record sheet. The wheels 16 and 33 and the stylus arrangement are disposed adjacent the moving record sheet and mechanism is provided for intermittently rotating the marking wheels 16 and 33 to position the marking wheels in accordance with the time established by a master clock and for moving the marking wheels and stylus arrangement into marking contact with the moving record sheet at the end of each five minute interval and one minute interval, respectively. In Fig. 1 of the drawings, an electrical circuit is shown which operates to effect rotation of the marking wheel 16 providing the hour designations. This electrical circuit includes an auto-transformer 1, which at one terminal is connected to a conventional electric supply line 2 and at its other terminal is connected to ground, as at 3. An intermediate tap 4 extending from the transformer 1 provides an electric supply of safe voltage for use by the electrical elements of the time marking device, and two master mercury switches 5 and 6 are connected in parallel or shunt to the tap 4. The switches 5 and 6 are respectively connected in series with terminal strips or lines 7 and 8, and six branch lines 9 and six branch lines 10 extend from the terminal strips 7 and 8, respectively. Each of the branch lines 9 has a mercury switch 11 interposed therein, and each of the branch lines 10 has a mercury switch 12 interposed therein. A commutator 14 is provided with twelve mutually insulated segments 13 of equal angular extent, with each of the segments 13 corresponding to an hour designation on the marking wheel 16, and the branch lines 9 and 10 are connected to alternate segments of the commutator. That is, the branch lines 9 are connected to the segments 13 corresponding to the odd hours 1, 3, 5, 7, 9, and 11, while the branch lines 10 are connected to the segments 13 corresponding to the even hours 2, 4, 6, 8, 10, and 12.

A rotatable brush 15 is disposed to sweep over the segments 13 and is connected to the marking wheel 16 for rotation with the latter. The brush 15 is connected by an electric conductor 17 to one terminal of an electro-magnet 18, while the other terminal of the electro-magnet is connected to ground. Thus, the electro-magnet 18 will be energized whenever an electric circuit is completed from the source 2 through the master switch 5, the terminal strip 7, one of the mercury switches 11, the related one of the branch lines 9, the segment 13 to which the latter is connected, the brush 15 in contact with that segment and the conductor 17; or through the master switch 6, the terminal strip 8, one of the mercury switches 12, the related one of the branch lines 10, the segment 13 to which the branch line is connected, the brush 15 in contact with that segment and the conductor 17. A pivoted armature 19 is disposed adjacent the electro-magnet 18 for actuation by the latter and carries an arm 20 having a latch or hook 21 at its free end. The mechanism for rotating the marking wheel 16 also includes a cam follower lever 22 which is pivotally mounted at 23 and is yieldably urged into engagement with a radial cam or eccentric 24 by a spring 191. The radial cam 24 is continuously rotated during the operation of the time recording device by a suitable mechanical drive (not shown) to cause oscillation of the lever 22, and the latter is connected by linkage 26 to a pawl engaging a ratchet 25 secured to the marking wheel 16 so that the oscillation of the lever 22 causes step-by-step rotation of the marking wheel. The lever 22 is arranged in relation to the arm 20 so that, when the electro-magnet 18 is energized and raises the arm 20, the latch 21 on the raised arm engages the end of the lever 22 and holds the latter out of contact with the cam 24 to prevent oscillation of the cam follower lever. Thus, so long as the electro-magnet 18 is energized, the marking wheel 16 remains stationary in the rotational sense.

Figures 2, 3:
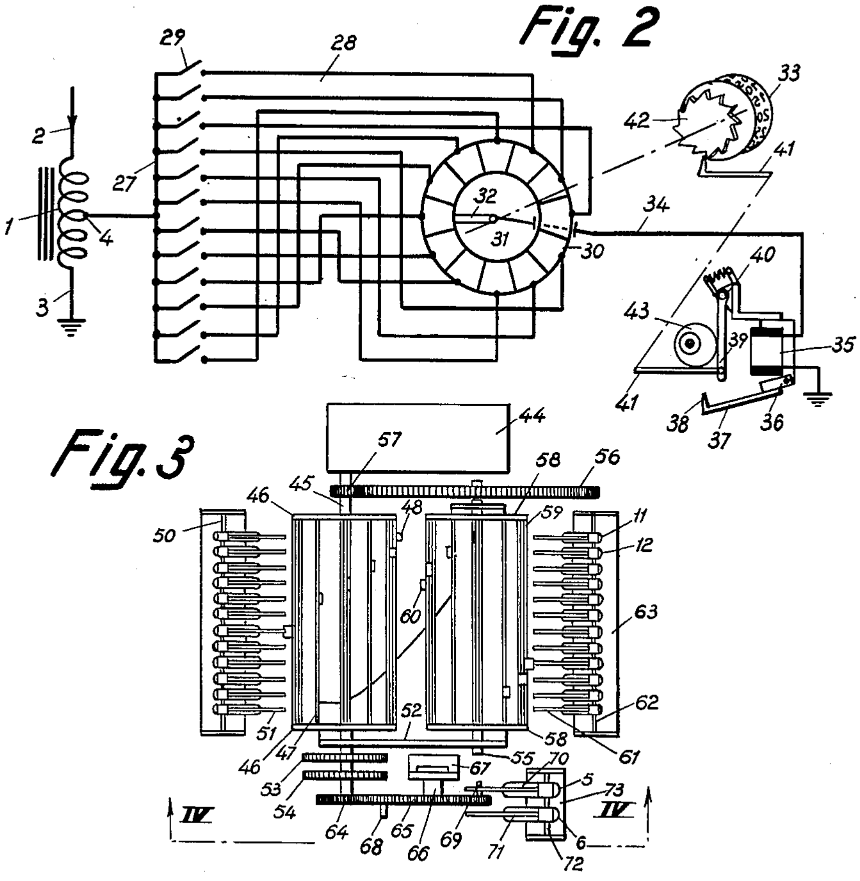
Fig. 2 is a diagrammatic representation similar to Fig. 1, but showing the electrical circuits for synchronizing the position of a recording element for marking five-minute intervals with the master clock in the same apparatus.
Fig. 3 is a plan view of mechanism for controlling switches of the circuits in Figs. 1 and 2 by a master clock.

In Fig. 2 of the drawings, an electrical circuit is shown for effecting rotation of the marking wheel 33 which provides the numerical markings indicating five-minute intervals. This electric circuit includes a terminal strip 27 connected to the intermediate tap 4 of the transformer 1 and twelve branch lines 28 extending in parallel from the terminal strip and each having a mercury switch 29 interposed therein. The branch lines 28 are connected to the twelve mutually insulated segments 30 of a commutator 31, and a brush 32 is fixed for rotation with the marking wheel 33 and arranged to sweep over the segments 30. The twelve segments 30 correspond to the twelve marking elements or type pieces on the periphery of the wheel 33 for marking five-minute intervals of time. An electrical conductor 34 extends from the brush 32 to one terminal of an electro-magnet 35, and the other terminal of the electro-magnet is grounded, as shown. A pivoted armature 36 is disposed adjacent the electro-magnet 35 to be actuated by the latter and carries an arm 37 having a latch or hook 38 at its free end.

The mechanism for rotating the marking wheel 33 further includes a cam follower lever 39 pivotally mounted at 40 and yieldably urged into contact with a radial cam or eccentric 43 which is continuously rotated during the operation of the time recording mechanism by a suitable drive mechanism (not shown) so that the cam follower lever is oscillated. The cam follower lever 39 is connected by suitable linkage 41 to a pawl engaging a ratchet 42 fixed to the marking wheel 33. Thus, rotation of the cam 43, with the lever 39 in engagement therewith, causes oscillation of said lever and step-by-step rotation of the marking wheel 33. However, the arm 37 is disposed so that, when it is raised by energization of the electro-magnet 35, the latch 38 engages the free end of the cam follower lever 39 and maintains the latter out of contact with the cam 43 to arrest oscillation of the lever 39 and rotation of the marking wheel 33. Further, it is apparent that the electro-magnet 35 will be energized whenever any one of the mercury switches 29 is closed and the brush 32 comes into contact with the segment 30 of the commutator associated with the closed mercury switch.

Figure 4:
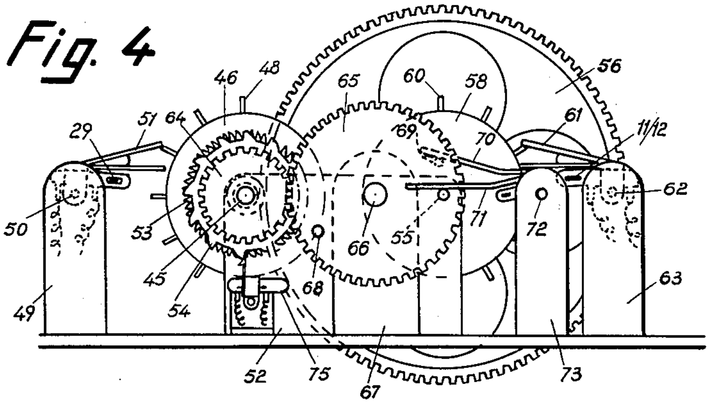
Fig. 4 is a rear elevational view, on an enlarged scale, of the mechanism shown in Fig. 3 and taken along the line IV—IV of the latter.

The mercury switches 5, 6, 11, 12 and 29 of the circuits illustrated in Figs. 1 and 2 are arranged and actuated in the manner shown in Figs. 3 and 4. The switch actuating mechanism includes a clock-work mechanism 44 which drives a shaft or axle 45 at a rotational speed of one complete revolution per hour. The shaft 45 is journalled in a frame 52 and has two circular discs 46 fixed thereon at axially spaced locations with rods 47 extending axially between the peripheries of the discs 46 to form a light-weight drum which can be rotated without any great exertion by the clock-work mechanism 44. Twelve actuating members 48 are secured to the rods 47 in a spirally arranged series and project radially from the light-weight drum. A support 49 extends parallel to the shaft 45 at one side of the drum formed by the discs 46 and rods 47, and a rock shaft 50 is carried by the support 49 and also extends parallel to the shaft or axle 45. The twelve mercury switches 29 of the electric circuit in Fig. 2 are rockably mounted on the rock shaft 50 in the radial planes of travel of the actuating members 48. The switches 29 normally are disposed in a level or horizontal position, in which the corresponding electrical circuits are open, and each of the mercury switches 29 has a finger 51 extending therefrom into the path of travel of the related one of the actuating members 48. The shaft 45 is rotated in the direction (clockwise on Fig. 4) causing the actuating members 48 to approach the related fingers 51 from below so that, when a member 48 engages the corresponding finger 51, the latter is rocked upwardly to incline the related mercury switch 29 and effect closing of the related electric circuit until the finger 51 is released by the actuating member and the switch is permitted to return to its level or horizontal open position. Further, the circumferential spacing between the rods 47 and the corresponding actuating members 48 is such that two consecutively arranged switches of the switches 29 are always sufficiently inclined to effect closing of the related circuits.

The end of shaft 45 remote from the clock-work mechanism 44 extends beyond the frame 52 and has two ratchet wheels 53 and 54 keyed or otherwise secured thereto for a purpose hereinafter described in detail. Further, a shaft 55 extending parallel to the shaft 45 is rotatably journalled in the frame 52 and has a spur gear 56 fixed on one end to mesh with a spur gear 57 fixed on the adjacent end of the shaft 45. Thus, the shaft 55 is driven from the shaft 45, and the ratio of the number of teeth on the gear 56 to the number of teeth on the gear 57 is such that the shaft 55 will undergo one-twelfth of a revolution for each complete revolution of the shaft 45, when the marking wheel 16 has marking elements thereon for twelve hours. For example, the gear 56 may have one hundred and twenty teeth, while the gear or pinion 57 may have only ten teeth.

Two circular discs 58 are fixed to the shaft 55 at axially spaced locations, and twelve rods 59 extend between the peripheral portions of the discs 58 parallel to the axis of the shaft 55 and spaced apart for equal circumferential distances. The rods 59 have twelve actuating members 60 extending radially therefrom in a spiral series, and the switches 11 and 12 of the electric circuit in Fig. 1 are alternately arranged, as shown, and rockably mounted on a rock shaft 62 carried by a support 63, which extends parallel to the shaft 55 at one side of the light-weight drum formed by the discs 58 and rods 59. Each of the switches 11 and 12 normally rests in a horizontal or circuit open position and is provided with a finger 61 extending into the path of travel of the related actuating member 60 so that, as the shaft 55 is rotated, the switches 11 and 12 are alternately and successively rocked to inclined and circuit closing positions by engagement of the members 60 with the fingers 61. While the switches 11 and 12 are alternated on the rock shaft 62 and follow the order of the commutator segments 13 to which they are connected (Fig. 1), it is to be understood that the same result can be obtained, that is, the alternate closing of a switch 11 and then a switch 12, by grouping together the switches 11 and the switches 12 on the rock shaft 62 and by arranging the actuating members 60 in two semi-spirals (not shown) which are angularly offset relative to each other so that a member 60 of one semi-spiral first acts to incline a switch 11 and then a member 60 of the other semi-spiral acts to incline a switch 12, and so on.

In order to alternately actuate the mercury switches 5 and 6 (Fig. 1), a spur gear 64 is fixed to the free end of the shaft 45 and meshes with a spur gear 65 rotatably carried by a stub shaft 66 suitably mounted in a bracket 67. The number of teeth on the gear 65 is preferably twice the number of teeth on the gear 64 so that the gear 65 will undergo only one-half revolution for each complete revolution of the gear 64. The gear 65 has two axial projections or pins 68 and 69 extending from the opposite sides thereof at locations spaced radially from the axis of rotation and angularly displaced 180° with respect to each other. The mercury switches 5 and 6 are mounted rockably on a common rock shaft 72 carried by a support 73, and fingers 70 and 71 extend from the switches 5 and 6, respectively, at opposite sides of the gear 65 to be rocked by the pins 69 and 68, respectively, for inclining the switches from their normal horizontal, circuit closed positions.

The switches 11 and 12 are related to their actuating members 60 so that these switches close 10 minutes before the time for changing the rotational position of the marking wheel 16 and then open again ten minutes after the time for the change in the rotational position of the wheel 16. However, the switches 5 and 6 are related to their actuating pins 69 and 68 so that the switches 5 and 6 alternately open and close 3 minutes before and after the time for changing the rotational position of the hour indicating marking wheel 16. Since the marking wheel 16 can be rotationally repositioned only when one or the other of the switches 5 and 6 is open, as hereinafter indicated in detail, it is apparent that the marking wheel 16 will not be rotationally repositioned until after the last five-minute indication prior to the changing of the hour indication has been printed on the record sheet by the wheel 33.

The above described mechanisms and electrical circuits operate in the following manner to synchronize the rotational positions of the marking wheels 16 and 33 with the actual time established by the clock-work mechanism 44 in the following manner:

1. In the case of the marking wheel 16 for indicating the hour, the actuating members 60 will maintain one of the switches 11 and an adjacent one of the switches 12 in their inclined or circuit closing positions. Assuming that the closed switches are those indicated by the reference numerals 187 and 188 on Fig. 1, it will be noted that the switches 5 and 6 will also be closed at any time more than three minutes before the time for rotationally changing the position of the wheel 16, and that the segments 189 and 190 of the commutator corresponding to the closed switches 187 and 188 will carry current. If the marking wheel 16 is correctly positioned to begin with, the brush 15 will carry electric current from the segment 189 to the electromagnet 18 and the latter will raise the arm 20 to hold the lever 22 out of engagement with the rotated cam 24. Thus, the wheel 16 will remain rotationally stationary. Approximately three minutes before the change in the hour, the actuating pin 69 will cause rocking of the switch 5 to its open position thereby interrupting the supply of current to the terminal strip 7 and to the commutator segment 189 so that the electro-magnet 18 will be deenergized to permit lowering of the arm 20 and freeing of the lever 22. The freed lever 22 will be urged against the rotated cam 24 by the spring 191 and will be oscillated by that cam to cause the pawl engaging the ratchet wheel 25 to angularly advance the latter and the wheel 16 until the brush 15 rides onto the segment 190 and the wheel 16 is then positioned for marking the next hour. When the brush 15 engages the segment 190 which is still energized through switches 6 and 188, the electro-magnet 18 is again energized to raise arm 20 and stop oscillation of the lever 22 for arresting the wheel 16 in its new position. Subsequently, the continued movement of the shaft 55 will cause the actuating member associated with the switch 187 to release the latter and permit its return to a normal open position, but, before the time arrives for again changing the position of the hour indicating wheel 16, the next switch 192 (Fig. 1) will have been engaged and rocked to its closed position by the related member 60 to bring current to the commutator segment 193 so that, when the switch 6 is opened, the wheel 16 will be rotationally repositioned only until the brush 15 engages the segment 193 and the electro-magnet 18 is thereby energized again. Thus, the wheel 16 is rotated in a step-by-step manner at one hour intervals to present the proper marking element for contact with the record sheet.

2. The rotation of the wheel 33 for indicating the time in five-minute intervals is effected in substantially the same manner as that described above in connection with the wheel 16, with the exception that the opening of the circuits through the commutator segments 30 to the electro-magnet 35 is effected directly by the successive return of the mercury switches 29 to their open positions as the actuating members 48 move out of engagement with the fingers 51. That is, as the time for changing the position of the wheel 33 arrives, the switch 29 associated with the commutator segment 30 then engaged by the brush 32 will return to its circuit opening position and the electro-magnet 35 will be deenergized to release the latch 38 from the cam follower lever 39 which is then oscillated by the cam 43 to cause rotation of the ratchet 42 and the marking wheel 33 until the brush 32 contacts the next commutator segment carrying current. Since the closing of the successive switches 29 overlaps, as one switch opens, the next switch in line will be closed to limit the rotation of the wheel 33 to the increment required for disposing the next five-minute indication for marking of the record sheet.

It should be noted that the positions of the wheels 16 and 33 will be synchronized or conformed to the actual time as established by the clock-work mechanism 44 even after the time recording mechanism has been inoperative for a more or less extended period. Thus, when the cams 24 and 43 are rotated after a period of inoperativeness, the wheels 16 and 33 will be rotated until the respective brushes 15 and 32 contact energized commutator segments corresponding to the actual time, and then the electro-magnets 18 and 35 are energized to cause a halt in the rotational adjustment of the marking wheels at positions corresponding to the actual time at the renewal of operation. Further, since the clock-work mechanism 44 only rotates the light-weight drums carrying the actuating members 48 and 60 which rock the well balanced mercury switches, it is apparent that no great operating strain is placed upon the clock-work mechanism and there is no need to amplify the output of the latter. It is also apparent that the actual rotation of the marking wheels 16 and 33 is effected by mechanical means (the cams 24 and 43) apart from the clock-work mechanism, with the electro-magnets 18 and 35, controlled by the various mercury switches, being utilized to disconnect the cams from operative or coupled relationship with the marking wheels. Thus, the output of the clock-work mechanism does not constitute a limitation on the force that is available for shifting or rotationally adjusting the marking wheels.

The foregoing parts of this description have been concerned with the means for synchronizing the rotational positions of the marking wheels 16 and 33 with the actual time as established by the clock-work mechanism. The following parts of the description referring to Figs. 5 to 8, inclusive, will describe the mechanism and electrical circuits provided for moving the wheels 16 and 33 into marking contact with the record sheet at the end of each five-minute interval and for moving an additional marking element, hereinafter described in detail, into marking contact with the record sheet after each one-minute interval.

Figures 5, 6:
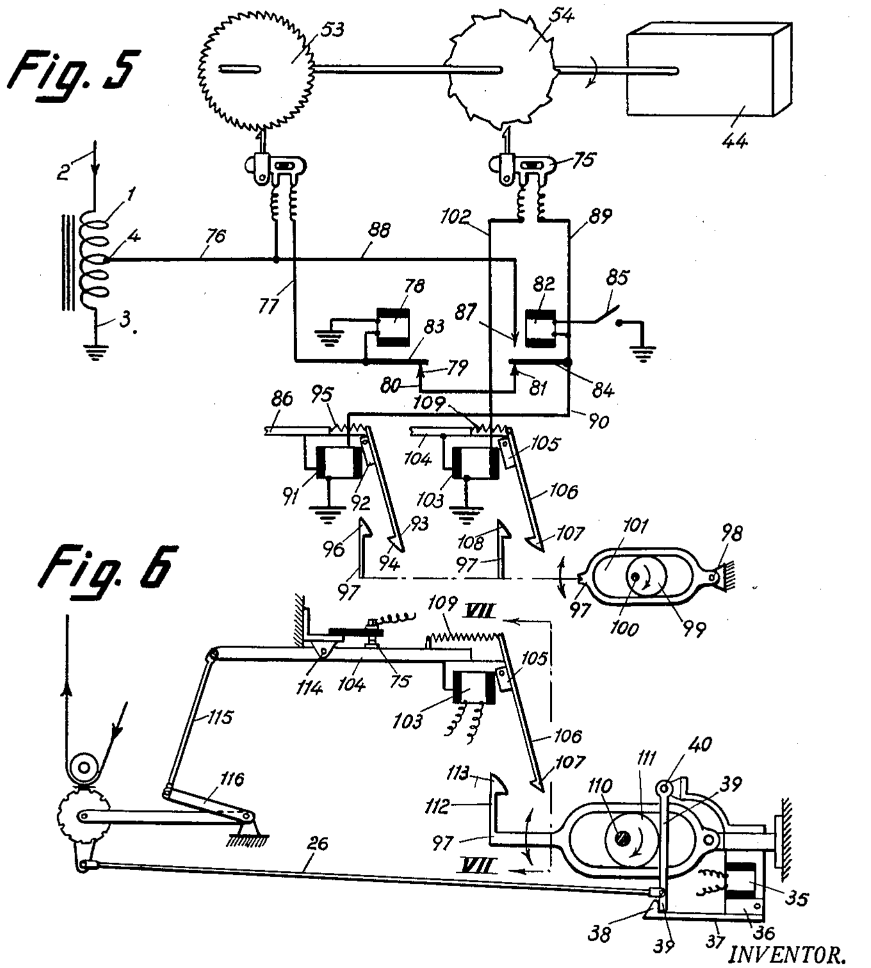
Fig. 5 is a diagrammatic representation of the electrical circuits and associated mechanical devices for effecting marking operation of the several time recording elements.
Fig. 6 is a schematic, side elevational view of a preferred arrangement of the mechanical devices shown in part in Figs. 1, 2 and 5.

As seen in Fig. 6, the marking wheels are mounted coaxially on the ends of rockable arms for movement substantially vertically toward and away from the record sheet which is fed around a back-up roller with an inked ribbon disposed between the record sheet and the marking wheels. Thus, when the marking wheels are raised to press the ribbon against the record sheet, an inked indication of the time in hours and five-minute intervals, such as, for example, 2:05, 2:10, and the like, will be imprinted on the record sheet. While the marking wheels 16 and 33 are moved into marking contact with the record sheet only at five-minute intervals, a mechanism, shown in Fig. 8, is moved into marking contact with the record sheet after each one-minute interval. The last mentioned mechanism is mounted alongside the marking wheels 16 and 33 on rockable arms **116*d* independent of the arms supporting the marking wheels for substantially vertical movement toward and away from the record sheet, and includes two spaced bars 116*b* and 116*c* carried by the arms 116*d*. One or more styluses 116*a* are slidably mounted in the bars 116*b* and *c* and project upwardly from the latter to press at their upper ends 116*e* against the inked ribbon when the arms 116*d* are raised and thereby imprint a minute indication, in the form of a dot or line, on the record sheet. In order to ensure uniform marking pressure, each of the styluses 116*a* has an abutment 116*f* thereon against which a compression spring 116*g* acts to yieldably urge the related stylus to a position in which the abutment 116*f* engages against the lower face of the bar 116*b***.

In accordance with the present invention, the clock-work mechanism 44 also controls the movements of the marking wheels 16 and 33 and of the minute indicating styluses **116*a* into and out of marking contact with the record sheet. For this purpose, mercury switches 74 and 75 are rockably mounted adjacent the peripheries of the toothed wheels or ratchets 53 and 54, respectively, fixed on the shaft 45 driven by the clock-work mechanism 44. The ratchets 53 and 54 have sixty and twelve teeth, respectively, and each of the switches 74 and 75 has a finger extending therefrom to ride on the periphery of the related ratchet. The switches 74 and 75 are mounted for normal disposition in circuit open positions and they are rocked to circuit closing position whenever the related finger encounters a tooth on the periphery of the corresponding ratchet. Since the shaft 45 undergoes one complete revolution in an hour, ratchet 53, having sixty teeth, will cause closing of the switch 74 after each minute while ratchet 54, having twelve teeth, will rock switch 75** to its circuit closing position at the end of each five-minute interval.

As seen in Fig. 5, one of the terminals of the mercury switch 74 is connected to the intermediate tap 4 of the transformer 1 by a conductor 76, and the other terminal of switch 74 is connected by a conductor 77 to a terminal of a normally closed simple relay 78 which has its other terminal grounded. A bridging line 80 extends from the fixed contact 79 of the relay 78 to the fixed contact 81 of a double acting relay 82. The movable contact or blade 83 of the relay 78 is connected to the conductor 77, while the movable contact or blade 84 of the relay 82 is connected to the input to the coil of the latter with the other end of the coil of the relay 82 being connected to ground through a normally closed switch 85. The switch 85 is preferably mounted on a rocking control lever 86 in the mechanical arrangement of the parts to be opened and closed by rocking of the lever 86 which controls the movements of the minute indicating styluses **116*a***, as hereinafter described in detail.

The double-acting relay 82 is arranged so that the blade or movable contact 84 thereof normally engages the fixed contact 81, and the other fixed contact 87 of the relay 82, which is normally out of contact with blade 84, is electrically connected to the tap 4 through a conductor 88 and the conductor 76. The input to the coil of relay 82 is carried by a conductor 89 extending from one terminal of the mercury switch 75, and another conductor 90 extends from the input side of the relay 82 to one side of an electromagnet 91 which is grounded at its other side. The electro-magnet 91 is mounted on one end of the lever 86, which is pivotally supported intermediate its ends, and an armature 92 is rockably mounted on the lever 86 adjacent to the electro-magnet 91 and carries an arm 93 having a hook or latch member 94 at its lower free end. A spring 95 (Fig. 5) yieldably urges the arm 93 to rock to a position in which the hook 94 is separated from a complementary hook or latch member 96 extending upwardly from one end of a rocking member 97. The rocking member 97 is pivotally mounted at its other end, as at 98, and is formed with a longitudinal slot 101 which receives an eccentric 99 on a rotated shaft 100. Thus, as the shaft 100 is rotated, the eccentric 99 causes oscillation of the member 97 about its pivot 98. So long as the hooks 94 and 96 are disengaged from each other, the rocking of the member 97 is not communicated to the lever 86 which carries the minute indicating styluses **116*a*. However, when the armature 92 and arm 93 are rocked by energization of the electro-magnet 91, the hooks 94 and 96 engage and the lever 86 is rocked by the rocking movement of the member 97 to move the styluses 116*a*** into and out of marking contact with the record sheet.

Still another conductor 102 extends from the other terminal of the mercury switch 75 to one side of an electro-magnet 103 which is mounted on an end of a rocking control level 104 and has its other side grounded. The lever 104 is provided for controlling the movements of the marking wheels 16 and 33 toward and away from marking contact with the record sheet and has an armature 105 rockably mounted thereon adjacent the electro-magnet 103. An arm 106 is carried by the armature 105 and has a hook or latch member 107 at its free lower end for engagement with a complementary hook or latch member 108 extending upwardly from the rocking member 97. A spring 109 is connected to the arm 106 to yieldably urge the latter to a position separating the hook 107 from the hook 108, and the electro-magnet 103, when energized, operates to rock the arm 106 to a position in which the hooks 107 and 108 engage and the lever 104 is rocked by the movement of the member 97 to move the marking wheels 16 and 33 into and out of marking contact with the record sheet.

In accordance with the structural embodiment of the invention illustrated in Figs. 6 and 7, a single drive shaft 110 is provided with an eccentric 111 which takes the place and performs the functions of the eccentric 24 (Fig. 1), the eccentric 43 (Fig. 2) and the eccentric 99 (Fig. 5). The eccentric 111 has a sufficient axial length to permit the member 97 to extend over a central portion thereof, while the levers 22 and 39 of the arrangements shown in Figs. 1 and 2, respectively, engage the eccentric 111 at the opposite side of the member 97, it being understood that only the lever 39 and the associated magnet 35, armature 36, arm 37 and latch 38 are visible in the view of Fig. 6. Further, in the arrangement of Figs. 6 and 7, the hooks 96 and 108, which are shown separately in Fig. 5, are incorporated into a single wide hook member or latch 113 formed at the top of a web 112 extending from the free end of the rocking member 97, and the control levers 86 and 104 are rockably mounted in side-by-side relationship on an axle 114 with the arms 93 and 106, carried by the levers 86 and 104, respectively, being formed to dispose the hooks 94 and 107 close together (Fig. 7) for selective engagement with the hook member 113.

The end of the lever 104 remote from the electromagnet 103 is pivotally connected to a rod or link 115 which is in turn connected to a crank arm 116. The crank arm 116 is angularly fixed relative to the pivoted arms carrying the marking wheels 16 and 33 for marking of the hours and the five-minute intervals. While the lever 86 is not visible in the view of Fig. 6, it is to be understood that the end of that lever remote from the electromagnet 91 has a similar operative connection to the pivoted arms **116*d* (Fig. 8) which support the styluses 116*a* for marking the one-minute intervals. Further, it is to be understood that the movable contact of the switch 85 (Figs. 5 and 6) is carried by the lever 86 and is arranged to engage the related fixed contact when the lever 86 is in its normal, at rest, position, and to move away from that fixed contact when the magnet bearing end of the lever 86 is depressed by engagement of the hooks 93 and 113**.

The electrical circuits and mechanisms described above for moving the various marking elements into marking contact with the record sheet operate as follows:

At the end of each minute, the ratchet 53 acts to close the mercury switch 74 and an electrical circuit is completed from the tap 4 of the transformer through conductor 76, switch 74, conductor 77, movable contact 83 of relay 81, bridging conductor 80, movable contact 84 of relay 82, conductor 90, electro-magnet 91, and back through the ground. The energized electro-magnet 91 attracts the armature 92 to swing the arm 93 to a position in which the hooks 94 and 96 or 94 and 113 become engaged. As the member 97 is rocked downwardly, it draws the lever 86 with it, by reason of the interengaged hooks, and the rocking of the lever causes the support arms **116*d* to rock in the direction displacing the styluses 116*a*** into marking contact with the record sheet on the back-up roller to provide a recording of a minute interval on the record sheet.

The closing of mercury switch 74 also causes energization of the relays 78 and 82, and the energized relay 78 soon moves the contact 83 away from the fixed contact 78 to interrupt the circuit through the bridging line 80. However, the energized relay 82 also causes movement of the blade or movable contact 84 out of contact with the fixed contact 81 and into contact with the other fixed contact 87 so that the electro-magnet 91 continues to be energized through the alternate circuit formed by conductors 76 and 88, contacts 87 and 84, and conductor 90.

The contact breaker or switch 85 remains closed until the hooks 94 and 96 or 94 and 113 have been engaged and the lever 86 begins to move from its at rest position. The opening of switch 85 interrupts the circuit through relay 82 and the latter is deenergized to return the blade 84 to a position of contact with the contact 81 thereby halting the energization of the electro-magnet 91. However, the hooks 94 and 96 or 94 and 113 continue to engage each other so long as the member 97 is exerting a downward pull on the related end of the lever 86. When the lever 86 returns to its original or at rest position at the end of a complete rocking cycle, the switch 85 closes again, but the relay 82 cannot be energized again to repeat the operation since the energized relay 78 continues to hold the movable contact 83 away from fixed contact 79 and the blade 84 of relay 82, is in contact with fixed contact 81. When the ratchet 53 has rotated sufficiently to permit return of mercury switch 74 to its normal open position, the relay 78 is deenergized to permit return of contact 83 to its normal closed position against fixed contact 79 and the circuit is again in readiness to cause movement of the one-minute indication marking means into contact with the record sheet when the next tooth on ratchet 53 comes into operative or switch closing position.

Every five minutes, in addition to the above operations, the ratchet 54 acts to rock mercury switch 75 to its closed position and the electro-magnet 103 is then energized, along with the electro-magnet 91, by current passing through the shunt circuit formed by the conductor 89, closed switch 75 and conductor 102. The energized electro-magnet 103 then attracts the armature 105 to rock the arm 106 to a position in which the hooks 107 and 108 or 107 and 113 engage to cause rocking of the lever 104 which controls the movement of the marking wheels 16 and 33 into and out of marking contact with the record sheet. The described circuits operate in the same manner to prevent repeated rocking of the lever 104 as has been described in connection with lever 86 so that, after each minute, the styluses 116*a* provide a single mark or one-minute indication, while, at the end of each five-minute interval, the marking wheels 16 and 33 provide a single printing of the hour and minutes representing the actual time then established by the clock-work mechanism 44.

While the marking wheel 16 has been described as having only twelve marking elements on the periphery thereof to mark the hours 1 to 12, inclusive, it is to be understood that, with suitable alteration of the various gear ratios, the marking wheel 16 may be provided with twenty-four equally spaced marking elements to mark all of the hours of the day.

Having reference to Figs. 9, 10 and 11, the improvements applied to the devices for the change of the ink impregnated tape drawing direction comprise a bushing 117 coupled to the driving axle 118 of the said device, said bush being provided with a peripheral groove 119 into which a pointer 120 is introduced being dependent of a member 121 sliding along a prismatic guide 122 parallel to the axle 118, the said member being endowed, furthermore, with a frame 123 located between the poles of two electromagnets 124 and 125 the functional axis of which is parallel to axle 118. The movement which the separation of the polar elements of both the electromagnets allows the frame 123 is sufficient to determine the running direction of the ink impregnated tape 126 by the alternate coupling of the corresponding two angular pinions 127 and 128 with the respective wheels 129 and 130 keyed to the shafts 131 and 132 of the tape spools 133 and 134.

One of the ends of the axle 118 carries a second bushing 135 co-operating with a lever 136 applied against the said axle by a support 136*a* rocking on an extreme pivot 137 and correlated by means of a strut 138 with the armature 139 of an electromagnet 140, the sum of the thicknesses of said bushing 135 and the lever 136 being equivalent to the axial displacement of the axle 118, necessary in order that the due coupling of one of the pinions 127 or 128 with the corresponding angular wheel 129 or 130 may take place, the other pinion remaining out of gearing with the corresponding wheel thereof.

The electrical relation of the mentioned devices is that shown in Fig. 12, on which is visible the auto-transformer 1 from the intermediate junction 4 thereof being taken a feeder 141 which is connected to one of the terminals of the electro-magnet 140 from the outlet of which is diverted another line 142 shunting towards one of the terminals of the mercury switches 143 and 144, each of them being arranged at the end of a lever 145 or 146 both oscillating on the corresponding pivots 147 and 148, each of the said levers being endowed at the opposed end thereof with small forks 149 and 150, the grooves thereof allowing the passage of the tape 126, but do not permit that of the terminal stops 151 with which this kind of tapes are normally provided.

From the opposite terminal of the two mercury switches 143 and 144 start two conductors 152 and 153 which are connected to the inlet terminals of the corresponding electro-magnet 124 or 125, the outlet thereof being connected in common to ground.

According to the improvements which are described the breaking and recovering system of the recorded paper strip 154 comprises a cross head 155 fixed to the driving axle 156 (Figs. 13 and 14), and having at one of the ends thereof a short rotatory axle 157 bearing keyed thereto two toothed wheels 158 and 159, the gear 158 thereof being of greater size engaging with a small pinion 160 placed in free rotatory arrangement on the axle 156, whilst the wheel 159 meshes with another one of greater diameter, 161, forming integrally a second wheel 162, especially arranged to engage with another gear 163 fixed on the axle 164 as a support for the recovery or take-up roller 165, the ensemble being arranged in such a manner that the velocity attained by the pinion 160 may supply a reacting exertion sufficient to effect the traction of the said roller 165.

As to the electric code or marks impulses generating devices, characteristic of each of the labour stages to be supervised, said devices are illustrated in Fig. 15 in which the axle 166 is given a rotatory movement provided by an electromotor working in synchronism with the driving motor of the mechanical appliances of the supervisory control apparatus, for example, small power single-phase induction motors connected to one and the same electric current feeder the frequency of which is relatively constant.

On the axle 166 is disposed in a fixed manner a plurality of discs 167 the periphery thereof being toothed according to groups of teeth, variable and suitable for each of the recording types which may be wanted to be obtained. On the toothed periphery of the said discs lean contact claws 168 fixed to the ends of the movable sheet 169 of just as many contact switches 170. One of the terminals of the said switches is connected to a common mass, whilst the others are connected to the detectors arranged on each of the machines that are to be supervised.

By way of example, Figs. 16 and 17 represent a case of application of the said detectors to the rotatory turret of a turret lathe, the said detectors being constituted by a series of switches comprising as many members as operations of the turret have to be supervised. For instance, in the case referred to, there are disposed six double switches 171, each of them being arranged in a transversal plane, different with respect to the axis of rotation of the head 172, supporting end of run stops of the said turret, said head showing a series of eccentric stubs 173 that are in number equal to the positions which the former may occupy in such a manner that in each of the said positions one of the said stubs may actuate the corresponding switch 171.

In said switches each of the sets of contacts 174 and 175 is devoted to transmit the selected electrical impulses code to one of the hammers of a related control on the recording apparatus in such a manner that it will be possible by connecting in a suitable manner the six switches 171 to the said impulses conductor lines, to obtain a complete series of different tracing combinations on each of the hammers of every control.

In Fig. 18 is represented a generalized diagram of connections, comprising a recording apparatus 176 installed at a distance from a machine room having two machines 177 therein, in the vicinity of which is established an impulses generating appliance, represented by the rectangle 178.

On the impulses generating appliance 178 have been represented four switches 179 corresponding to just as many discs 167 which provide the same number of codes of electric impulses. The four switches 170 are in common grounded by means of line 179 which, in the practical case of installation making use of lead armour protected conductors, is arranged in such a manner that it is extremely easy to attain a common mass for all the instruments, which mass as such, and for the purpose of the protection of the installation, may be easily grounded by any of the known methods.

From the impulses generating apparatus 178, located in the vicinity of the labour rooms in which the machines 177 to be supervised are installed, start the lines 180 forming a network of general distributors feeding the groups of the detector devices switches, mounted on each of the machines, by means of primary codes of impulses, the connections being performed in such a manner that, with a given number of the said primary codes, it is possible to obtain the convenient number of resulting codes or signs for the supervisory control of all working operations of the machines in question. This is very easy to attain by the adequate interconnection of the switches which are directly connected to the lines 180 with those that are not.

All the contacts 174 for each machine are connected to a same conductor 181 whilst the contacts 175 are connected in the same way to another conductor 182, forming a two-wire line for each machine, this being the sole means of connection which in accordance with the said system is required for the transmission of the indications of the operation thereof to the recording apparatus, which for this same reason may be located at spots very distant from those occupied by the said machines, since the installation cost of the said lines is relatively low in comparison with the whole of the installation, being rapidly amortized by the benefits that a rationalized supervisory control of the output contribute to the industry.

Each pair of conductors 181 and 182 corresponds to a same recorded graph, each of them being connected to one of the control electromagnets of the two printing hammers of the former, said electromagnets being represented in Fig. 18 with the numeral references 183 and 184. The current outlet of each of said pairs of electromagnets is performed in common over switches 185, especially arranged to permit halting of the operation of the recording means of each of the graphs at will, the opposite terminals of said switches being connected to the general feeder 186 of the control circuits for the described recording devices from the intermediate junction 4 of the auto-transformer 1.

The foregoing description has been based upon the premise that each control comprises two recording hammers which in the practice are sufficient to cover completely the whole range of possible working stages. Said number, however, may be increased in special cases, for the purpose to obtain a greater variety of combined codes.

This arrangement of mounting at a distance is specially advisable in those cases in which the number of machines and the extension of the factory may justify the same but, notwithstanding, it is not entirely indispensable, since in cases of relatively little importance the impulses generating device may be likewise disposed such as to form part of the recording apparatus as such, in which case, if the distances to be covered make it advisable, a general line, which may comprise as many conductors as primary codes may be wanted to be disposed of, will be added to the arrangement of two wires for each machine all of them starting from the said recording apparatus.

The example described in Figs. 16 and 17, as well as the arrangement illustrated on Fig. 18, do not constitute limitations of the character of the invention, for it will be of course possible to vary at will the number of the pairs of switches 171, according to the number of operations that may be wanted to be recorded. In the same manner the number of disposable primary codes or signs will be optional and always in accordance with the diversity of the said operations.

In the described form of embodiment, preference has been given the relays, the normal working positions thereof being that of closed circuit; the invention, however, may be likewise carried out making use of open circuit relays, with some slight unessential variations, without changing the subject-matter of the invention. Moreover, mention of mercury tube switches does not preclude the application of another type of switches suitable for the object which the same are destined for.

Other accessory arrangements for complementing the precision of the recorded graphs, comprise the inscription of the said graphs in colour different from that of the time references, by use of the many-coloured ribbons commonly utilized in typewriters. Likewise is foreseen the possibility of recording the graphs corresponding to the different shifts of labour in different colours for the easy distinction thereof, in combination with the time marked by the master clock.

The operation of the running direction reversing devices of the ink impregnated tape is described with reference to Figs. 9, 10, 11 and 12. When the tape contained on one of the spools is completely unwound, for instance, on spool 134, the stop 151 strikes against the small fork 150 of the lever 146 causing the mercury switch 144 to tilt whereby the folowing operations are determined: The current proceeding from the auto-transformer 1 passes through the line 141 crossing the electromagnet 140 which lifts the lever 136 allowing the axle 118 to be displaced longitudinally. From the electromagnet 140 the current follows its path over switch 144 passing through the conductor 142 and therefrom through the electromagnet 125 to earth. Said electromagnet 125 attracts the frame 123 whereby the pointer 120 actuating on the bushing 117 causes the displacement of the axle 118 towards the right, whereby is uncoupled the set of wheels 127 and 129, the gears 128 and 130 being coupled and, in consequence thereof, the tape 126 which up to this moment was running towards the left, begins to move towards the right. When the stop 151 releases the fork 150, the switch 144 opens again the circuit disexciting the electromagnet 140 which drops the lever 136, now being placed at the other side of the ring 135, preventing any movement of the axle 118 tending to uncouple the set of wheels 128 and 130. The same operation in inverse direction is repeated when the tape wound on spool 133 comes to an end and so on, successively.

From the simple observation of Figs. 13 and 14 may be learned that the rotation of the crosshead 155 causes the small wheel 159 to run on wheel 161 which remains almost fixed on account of the resistance exerted by the recovery or takeup roller 165, said rotation resulting in an exceedingly multipled speed on reaching the pinion 160 the friction thereof on the axle 156 giving rise to a tangential exertion upon the wheel 161 which, when for some reason the tension of the paper strip 154 is lacking, will determine the rotation of the former and, simultaneously, that of the wheel 162 whereby the roller 165 is forced to rotate. In the case of unrolling the paper strip 154 by hand, the rotation of the wheels 161 and 162 will take place in contrary direction, as well as the increase of the velocity of the pinion 160. In the moment in which the said paper strip is released the tangential exertion upon the wheel 161 will be sufficient to cause the rotation of the roller 165 and the consequential winding up of the said paper strip 154.

From Fig. 15 is understood that the rotation of the axle 166 determines that of the indented discs 167 each of which, following the order established by the distribution of the teeth over the periphery of each of them will close, momentarily and periodically, the switches 170, giving rise to the passage of interrupted currents which will form primary codes of impulses which, combined by the groups of switches arranged on the detector devices of each of the supervised machines, will form the combined codes that determine the impression of the working graphs by use of the hammers the said kind of apparatus are provided with.

In the case described in Figs. 16 and 17, the placement of every tool of the turret in working position will determine the thrust of one of the stubs 173 under the corresponding switch 171 which by the closing of both the sets of contacts thereof, duly connected with one or two lines carrying the currents of primary code of impulses, will furnish a series of percussions, in characteristic distribution and spacing, for the hammers corresponding to the graph of the machine which will be characteristic of the operation which the same may be performing at that moment.

In Fig. 18 each of the lines 180 transmits a series of electric impulses, according to a primary code determined by the features of the discs 167 and to an arrangement of things in such a manner that for each specific operation of the supervised machine take place different connections of the contacts 174 and 175 and that for each of the said operations will be had in the conductors 181 and 182 a determined mark or sign which on arriving at the electromagnets 183 and 184 will produce the recording of a graph specific of the operation which enters into consideration. For instance, supposing that the lines 180 be connected to the switches of Fig. 15 in the same order in which they are represented on said figure, as to the distribution of the electric impulses and taking into account that the successive teeth produce a continuous recording, will be had in the lines 180, from left to right, the following primary codes:

(*a*) Successive tracing;
(*b*) Alternate traces and points;
(*c*) Interrupted traces;
(*d*) Separated points.

Thus, for instance, in the case that for a determined operation of the machine which corresponds the lower detector device 177 to, the switch represented by the numeral references 187 and 188 close, will be obtained in the conductors 181 and 182 a combination of electrical impulses which by means of the electromagnets 183 and 184 will give rise to a recording which for the hammer actuated by the electromagnet 183 will give a successive tracing, whilst the other hammer will record on the paper strip a succession of interrupted traces. From this sole explanation is understood that by combining in a suitable manner the connections between the pairs of switches 171, to one another and with the lines 180, it will be possible to obtain a variation of codes, covering excessively the whole scale of operations which may be performed by machines destined for any of the different branches of the industry, and even in successions of manual performances.

The invention, within its essentiality, may be carried out in other variants of embodiment than those given by way of example in the description, to which will likewise extend the claimed protection. Thus, it may be designed in any shape and size and in the manufacture thereof may be employed the materials most suitable for each case and suitably combined for attaining the intended purpose, all that being comprehended within spirit and scope of the claims.

Having now fully described and ascertained the nature of my said invention and in what manner the same is to be performed, I declare that what I claim as new and desire to secure by Letters Patent is:

1. In an apparatus for supervising the operation of devices which perform diverse operational steps; the combination of means for displacing a blank paper strip at a uniform speed, means for printing on said strip time reference marks depending on the performance of a master clock and including an hour reference marking cylinder, at least one fraction of an hour reference marking cylinder and respective synchronizing means including commutator and brush means for synchronizing the positions of each of said cylinders with the indications of said clock, means for printing on said strip records representative of the diverse operational steps of the supervised device, and an inking ribbon cooperating with both of said printing means; said means for displacing the paper strip including a take-up drum for the recovery of the latter, a driving shaft operatively connected to said drum, and intermediate reacting means for rotating said drum as the strip advances; first mechanical means operatively connected with the hour reference marking cylinder for intermittently rotating the latter by increments each corresponding to an hour, electro-magnetic means cooperating with said first mechanical means for alternatively permitting and preventing operation of the latter depending on the performance of the respective synchronizing commutator and brush means; second mechanical means operatively connected with the fraction of an hour reference marking cylinder for intermittently rotating the latter by increments each corresponding to a predetermined fraction of an hour, electromagnetic means cooperating with said second mechanical means for alternately permitting and preventing operation of the latter depending on the performance of the respective synchronizing commutator and brush means; mechanically operated means for urging the time reference marking cylinders against said paper strip, and related electromagnetic means for alternatively permitting and preventing the operation of said mechanically operated means depending on the indications of the master clock; each of said synchronizing means further including electrical circuits having mercury switches interposed therein and operated by the master clock for timely energizing at least one segment of the corresponding commutator; means for generating primary codes of electrical pulses, detecting means for electrically connecting said pulse generating means to the record printing means and for selecting at least two of said primary codes; electromagnets operatively connected to said detecting means to be energized by the latter; printing hammers mechanically connected to the last mentioned electromagnets to be operated by the latter depending upon the performance of the supervised device as sensed by said detecting means; and electromagnetic means for reversing the feed of said inking ribbon.

2. A device for recording the time at predetermined intervals upon a moving record sheet; said device comprising at least one marking wheel having spaced marking elements on the periphery thereof corresponding to certain of the intervals of time to be recorded, means for carrying a record sheet past said marking wheel, means rotatably supporting said marking wheel and movable to displace said marking wheel into and out of marking contact with the record sheet, a master clockwork mechanism continuously representing the actual time, marking wheel displacing means controlled by said clockwork mechanism and operative to displace said marking wheel into and out of marking contact with the record sheet at the end of said certain intervals of time to be recorded, a commutator having as many mutually insulated segments as there are marking elements on said marking wheel, a brush rotatable over said commutator for successive contact with said segments and coupled to said marking wheel for rotational movement with the latter, means operative to effect step-by-step rotation of said marking wheel, electro-magnetically actuated means effective when energized to render said wheel rotating means inoperative, a source of electric current, circuit means extending from said source to each of said segments for selectively supplying current to the latter, said brush being electrically connected to said electro-magnetically actuated means for supplying energizing current to the latter when said brush is in contact with a segment of said commutator having current supplied thereto, said circuit means being controlled by said clockwork mechanism so that at the end of the intervals of time, and in the order of, the corresponding marking elements, current is supplied to the segment corresponding to the next interval of time and the marking wheel is rotated until said brush contacts the segment to which current is supplied.

3. A device according to claim 2; wherein said circuit means includes mercury switches rockably mounted in a row for swinging about a common axis, a light-weight drum mounted for rotation about an axis parallel to the common swinging axis of said mercury switches and rotationally driven by said clock-work mechanism, actuating members extending radially from said drum in a spiral series, each of said actuating members being disposed for rotation in a radial plane passing through a corresponding one of said mercury switches, and finger means on each of said mercury switches extending into the path of travel of the related one of said actuating members so that the latter successively rock the related mercury switches from a normal open position to a closed position as said drum is rotated.

4. A device according to claim 2; wherein said marking wheel displacing means includes a rockable control lever connected to said movable supporting means to transmit rocking of the lever to the latter, and a continuously oscillated member, separable coupling means on said lever and said oscillated member for transmitting the oscillations of the latter to said lever, means yieldably maintaining said coupling means in separated condition so that said lever is normally stationary, electromagnetic means operative when energized to overcome said yieldable means and engage said coupling means, and electric circuit means controlled by said clock-work mechanism and operative to momentarily energize the last mentioned electro-magnetic means at the end of each of said intervals of time to be recorded so that the marking wheel will then undergo a single displacement into and out of marking contact with the record sheet.

5. A device according to claim 4; wherein said electric circuit means includes a source of electric current, a first normally closed relay, a second double acting relay having two fixed contacts and a movable contact engaging one of said fixed contacts, when the relay is energized, and the other of the fixed contacts when the relay is deenergized, a rockable mercury switch, actuated by said clock-work mechanism to rock from a normal open position to a closed position at the end of each of said time intervals, a series connected circuit including said mercury switch, the contacts of said first relay, and said movable contact and other fixed contact of the second relay, said source and said electro-magnetic means, the coils of said first and second relays being connected in parallel with said series connected circuit, normally closed switch means connected to said control lever and opened by rocking of said control lever, said switch means being interposed between the coil of said second relay and said series connected circuit, and said source being connected through said one fixed contact and movable contact of the second relay to said electro-magnetic means so that the latter is energized only after said mercury switch is rocked to its closed position and is thereafter immediately de-energized until said mercury switch is again rocked to its closed position thereby preventing repetitious displacement of said marking wheel into marking contact with the record sheet during any one of said time intervals.

6. A device for recording the time at predetermined intervals upon a moving record sheet; said device comprising means for supporting a moving record sheet, two marking wheels, one of said wheels having marking elements thereon corresponding to hour intervals and the other of said wheels having marking elements thereon corresponding to five-minute intervals, common support means rotatably supporting said marking wheels and movable to displace the latter between an inoperative position remote from the record sheet and an operative position in which said marking elements can effect marking contact with the record sheet, marking means for applying indications of one-minute intervals to the record sheet, support means for said one-minute interval marking means and movable independent of said common support means to displace said one-minute interval marking means into and out of an operative position in which the latter can effect marking contact with the record sheet, a master clock-work mechanism continuously representing the actual time, marking wheel displacing means controlled by said clock-work mechanism and operative to move said common support means and displace said hour and five-minute interval marking wheels to and from said operative position at the end of each five minute time interval, displacing means for said one-minute interval marking means operative to move said support means for the latter and to displace the one-minute interval marking means to and from said operative position of the latter at the end of each one-minute time interval, first synchronizing means controlled by said clock-work mechanism and operative to rotationally position said hour-interval marking wheel at the end of each hour time interval so that the one of said marking elements corresponding to the next hour is positioned for marking of the record sheet, and second synchronizing means controlled by said clock-work mechanism and operative to rotationally position said five-minute interval marking wheel at the end of each five-minute time interval so that the one of the marking elements on said five-minute interval wheel corresponding to the five-minute time interval then represented by the clock-work mechanism is positioned for marking of the record sheet.

7. A device according to claim 6; wherein each of said first and second synchronizing means includes a commutator having as many mutually insulated segments as there are marking elements on the related marking wheel, each of said segments corresponding to one of said marking elements on the related wheel, a brush rotatable over said commutator for successive contact with said segments and connected to said related marking wheel for rotation with the latter, means operative to effect step-by-step rotation of said related marking wheel, electro-magnetically actuated means effective when energized to render inoperative said wheel rotating means, a source of electric current, first circuit means extending from said source to each of said segments for selectively supplying current to the latter, second circuit means extending from said brush to said electro-magnetically actuated means for supplying energizing current to the latter when said brush is in contact with a segment having current supplied thereto, means actuated by said clockwork mechanism and controlling said first circuit means so that, at the end of each interval of time to which the marking elements on said related marking wheel correspond, the current supply to the segment corresponding to the concluded time interval is interrupted and current is supplied to the segment corresponding to the next time interval, whereby said electro-magnetically actuated means is de-energized to permit rotation of said related marking wheel until said brush comes in contact with said segment corresponding to the next time interval.

8. A device according to claim 7; wherein said means controlling first circuit means of said first synchronizing means include a normally open mercury switch connected in series with each of said segments, and two normally closed mercury switches connected in parallel to said source of electric current, means connecting the normally open mercury switches associated with alternately arranged segments in parallel with each other and in series with one of said two normally closed switches, means connecting the remaining normally open switches in parallel with each other and in series with the other of said two normally closed switches, switch actuating members associated with each of said normally open mercury switches and driven by said clock-work mechanism to close and open the normally open mercury switches in the order of their related segments with each normally opened switch being closed a predetermined time more than five minutes before the end of the hour time interval corresponding to the related segment and then re-opened a predetermined time after the conclusion of the corresponding time interval and after the normally open switch corresponding to the next hour time interval has been closed, and switch actuating members associated with each of said two normally closed mercury switches and operating alternately to open and then close the related normally closed switch at a predetermined time less than five minutes before and after, respectively, the end of each of the hour time intervals.

9. A device according to claim 7; wherein said means controlling the first circuit means of said second synchronizing means includes a normally open mercury switch connected in series with each of said segments of the related commutator, and means connecting said normally open mercury switches in parallel to said source, a switch actuating member driven by said clock-work mechanism and associated with each of said normally open switches to close and open the latter successively in the order of their corresponding segments and with the periods of closure of successive switches being overlapped.

10. A device according to claim 6; wherein said displacing means for the one-minute interval marking means includes a rockable control lever connected to said movable support means for the one-minute interval marking means to transmit rocking of the control lever to said support means, a continuously oscillated member, separable coupling means on said lever and oscillated member for transmitting the oscillations of the latter to said lever, means yieldably maintaining said coupling means in separated condition so that said lever is normally stationary, electro-magnetic means operative when energized to overcome said yieldable means and engage said coupling means, said electro-magnetic means being controlled from said clockwork mechanism so as to be momentarily energized at the end of each one-minute time interval so that said one-minute interval marking means then undergoes a single displacement to and from said operative position in marking contact with the record sheet.

11. A device according to claim 10; wherein said marking wheel displacing means includes a seond rockable control lever connected to said common support for the hour and five-minute interval marking wheels to transmit rocking of said second lever to said common support, second coupling means on said second control lever for coupling engagement with the coupling means on said oscillated member, means yieldably maintaining said second coupling means out of engagement with said coupling means on the oscillatable member so that said second lever is normally stationary, second electro-magnetic means operative when energized to overcome the last mentioned yieldable means and urge said second coupling means into coupling engagement with said coupling means on said oscillatable member, said second electro-magnetic means being controlled from said clockwork mechanism so as to be energized at the end of each five-minute time interval so that said hour and five-minute interval marking wheels then undergo a single displacement to and from said operative position in marking contact with the record sheet.

12. A device according to claim 11; wherein the first mentioned electro-magnetic means is controlled from said clockwork mechanism by electric circuit means including a source of current, a first normally closed relay, a second double acting relay having two fixed contacts and a movable contact engaging one of said fixed contacts when the relay is energized and the other of said fixed contacts when the relay is deenergized, a first rockable mercury switch normally disposed in an open position and rocked by said clockwork mechanism to a closed position at the end of each one-minute time interval, a series connected circuit included said mercury switch, the contacts of said first relay and said movable and other fixed contacts of the second relay, said source and the first mentioned electro-magnetic means, the coils of said first and second relays being connected in parallel with the said series connected circuit, normally closed switch means which is opened by rocking of said first lever and interposed between the coil of said second relay and said series connected circuit, and conducting means extending from said source and through said one fixed contact and movable contact of the second relay to said first electro-magnetic means so that the latter is only momentarily energized after closing of said first mercury switch to prevent repetitious displacement of said marking means during the periods between the ends of successive one-minute time intervals.

13. A device according to claim 12; wherein said second electro-magnetic means is controlled from said clockwork mechanism by second electric circuit means including a second normally open and rockable mercury switch rocked by said clock-work mechanism to closed position at the end of each five-minute time interval, and second conducting means electrically connecting said movable contact of the second relay to said second electro-magnetic means and having said second mercury switch interposed therein so that said second electro-magnetic means is only momentarily energized at the end of each five-minute time interval to effect a single displacement of said hour and five-minute interval marking wheels to and from their operative position in marking contact with the record sheet.

References Cited in the file of this patent

UNITED STATES PATENTS

| | | |
|---|---|---|
| 420,851 | Wood | Feb. 4, 1890 |
| 1,323,374 | Norwood et al. | Dec. 2, 1919 |
| 1,707,356 | Roy et al. | Apr. 2, 1929 |
| 1,863,285 | Shaw | June 14, 1932 |
| 1,965,121 | Kardorff | July 3, 1934 |
| 2,300,755 | Williams | Nov. 3, 1942 |
| 2,325,829 | Boswau | Aug. 3, 1943 |
| 2,376,879 | Matthews et al. | May 29, 1945 |
| 2,476,882 | Lexa | July 19, 1949 |
| 2,487,843 | Barnes, Jr. | Nov. 15, 1949 |
| 2,508,973 | Smith | May 23, 1950 |
| 2,517,055 | Thompson | Aug. 1, 1950 |
| 2,543,983 | Ostline | Mar. 6, 1951 |
| 2,553,644 | Fehr | May 22, 1951 |